J. A. SIMONDS.
Tool for Kitchen Use.
No. 163,416.            Patented May 18, 1875.
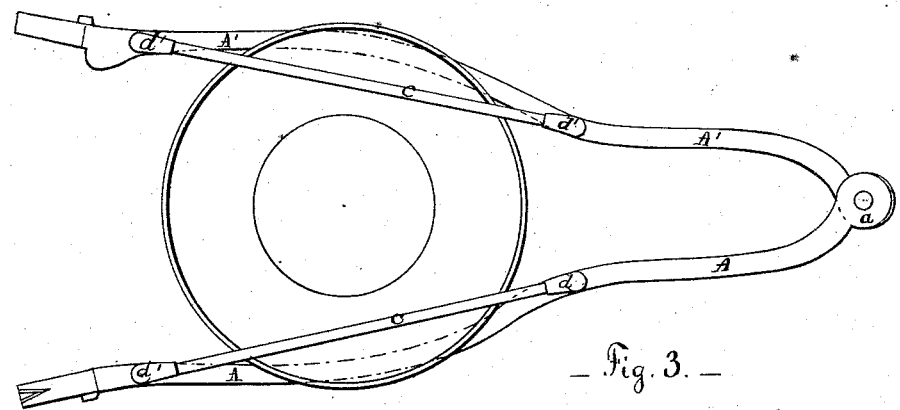
_Fig. 3._
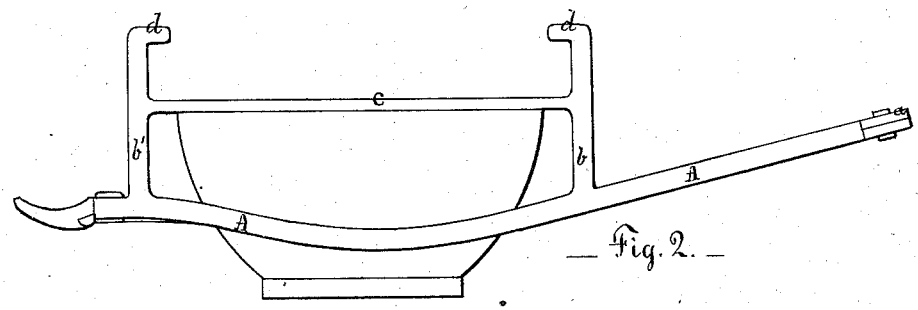
_Fig. 2._
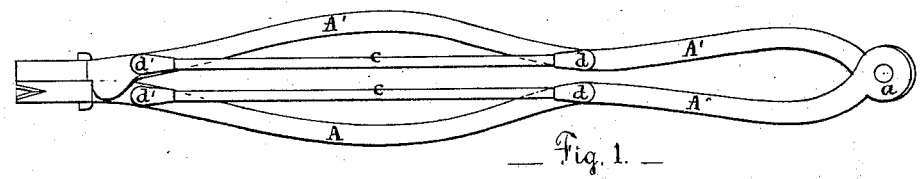
_Fig. 1._
Chas. F. Sleeper.
J. E. Knox.
Joseph A. Simonds
by J. E. Maynadier
his atty.
THE GRAPHIC CO. PHOTO-LITH. 39 & 41 PARK PLACE, N.Y.

UNITED STATES PATENT OFFICE.

JOSEPH A. SIMONDS, OF WASHINGTON, NEW HAMPSHIRE.

IMPROVEMENT IN TOOLS FOR KITCHEN USE.

Specification forming part of Letters Patent No. 163,416, dated May 18, 1875; application filed March 6, 1875.

*To all whom it may concern:*

Be it known that I, JOSEPH A. SIMONDS, of Washington, in the county of Sullivan and State of New Hampshire, have invented an Improved Tool for Kitchen Use, of which the following is a specification:

My improved tool consists of two arms, A A', hinged together at $a$, each of which arms bears two uprights, $b\ b'$, and the cross-piece $c$, and each arm is curved outwardly between the two uprights $b\ b'$.

By this contrivance plates are lifted quite as well as by any of the plate-lifters known to me; and, in addition, bowls, cups, and the like can be lifted and securely held, the cross-pieces $c\ c$ acting to insure a secure and firm hold upon the bowl, &c., as shown in Figs. 2 and 3 of the drawings.

In practice I usually so shape the ends of the arms that when brought together they will form a lifter for the covers of cooking-stoves; one of them may also be made a tack-claw. I also supply each of the uprights with hooks $d\ d'$, which will in some cases be found handy for lifting any vessel having a projecting rim. When used in this way the parts $b\ b'$ are held downward instead of upward.

I do not, of course, claim, broadly, a plate-lifter, as my invention is an improvement upon that tool; nor do I claim any part of the tool described in Letters Patent No. 154,384, granted to Orra I. Foster, dated August 25, 1874, the use of the uprights $b\ b'$ and the cross-pieces $c$ constituting the gist of my invention, and making my tool an improvement upon Foster's; but What I do claim as my invention is—

The improved tool above described, formed of the arms A A', hinged together at $a$, each arm having the two uprights $b\ b'$, connected together by a cross-piece, $c$, and each arm being curved outward between the uprights, as shown.

JOSEPH A. SIMONDS.

Witnesses:
J. E. MAYNADIER,
J. E. KNOX.